(12) United States Patent
Fuchs et al.

(10) Patent No.: US 6,960,148 B2
(45) Date of Patent: Nov. 1, 2005

(54) DIFFERENTIAL DRIVE WITH INTEGRATED CONSTANT VELOCITY JOINTS

(75) Inventors: Heinzwilli Fuchs, Mühleip (DE); Colin Zaers, Siegburg (DE); Werner Krude, Neunkirchen-Seelscheid (DE)

(73) Assignee: GKN Automotive GmbH, (DE)

( * ) Notice: Subject to any disclaimer, the term of this patent is extended or adjusted under 35 U.S.C. 154(b) by 31 days.

(21) Appl. No.: 10/478,244

(22) PCT Filed: Mar. 16, 2002

(86) PCT No.: PCT/EP02/02944

§ 371 (c)(1),
(2), (4) Date: Nov. 20, 2003

(87) PCT Pub. No.: WO02/097302

PCT Pub. Date: Dec. 5, 2002

(65) Prior Publication Data

US 2004/0168532 A1  Sep. 2, 2004

(30) Foreign Application Priority Data

May 26, 2001  (DE) ............................. 101 25 792

(51) Int. Cl.⁷ .............................................. F16H 48/06
(52) U.S. Cl. .................................... 475/222; 475/230
(58) Field of Search .............................. 475/222, 230; 464/145, 905, 906

(56) References Cited

U.S. PATENT DOCUMENTS

| | | | |
|---|---|---|---|
| 2,187,843 A | * | 1/1940 | Rzeppa ...................... 475/222 |
| 2,795,969 A | | 6/1957 | McCarthy |
| 4,244,241 A | | 1/1981 | Treadwell |
| 4,543,853 A | | 10/1985 | von Hiddessen et al. |
| 4,840,087 A | * | 6/1989 | Welschof et al. ........... 475/222 |

FOREIGN PATENT DOCUMENTS

| | | | |
|---|---|---|---|
| DE | 3000298 | * | 10/1980 |
| DE | 35 36 289 A1 | | 4/1987 |
| DE | 36 42 875 C2 | | 7/1988 |
| DE | 37 43 671 A1 | | 7/1988 |
| DE | 198 54 215 A1 | | 5/2000 |
| JP | 10-309957 | * | 11/1998 |

* cited by examiner

*Primary Examiner*—Ha Ho

(57) ABSTRACT

A differential drive having a drive housing (1) with a longitudinal drive axis ($A_G$); having a drivable differential carrier (11) which is rotatably supported in the drive housing (1) by means of two rolling contact bearings (22, 23), which comprises a longitudinal carrier axis ($A_K$), wherein, at the differential carrier (11), there are formed projections (20, 21) which extend co-axially relative to the longitudinal carrier axis and into which there are inserted outer bearing races (26, 27) of the rolling contact bearings (22, 23); and wherein, in the drive housing (1), there is provided a side opening (3) through which the differential carrier (11) with inserted outer bearing races (26, 27) of the rolling contact bearings (22, 23) can be inserted; and wherein, in the drive housing (1), there are provided bores (4, 5) into which there are inserted bearing holding rings (6, 7) which carry inner bearing races (28, 29) of the rolling contact bearings (22, 23) and which, together with said inner bearing races, can be inserted into the bores (4, 5) co-axially relative to the longitudinal drive axis ($A_G$).

10 Claims, 3 Drawing Sheets

DIFFERENTIAL DRIVE WITH INTEGRATED CONSTANT VELOCITY JOINTS

BACKGROUND Of THE INVENTION

The invention relates to a differential drive having a drive housing with a longitudinal drive axis $A_G$; having a drivable differential carrier which is rotatably supported in the drive housing by means of two rolling contact bearings, which comprises a longitudinal carrier axis $A_K$ and in which there are arranged and rotatably supported two axle shaft gears whose axes extend co-axially relative to the longitudinal carrier axis and in which differential carrier there is arranged a plurality of differential gears whose axes are arranged radially relative to the longitudinal carrier axis, said differential gears being held so as to rotate with said differential carrier, wherein said axle shaft gears engage the differential gears; and having constant velocity joints which are positioned inside the differential carrier and whose outer joint parts are connected in a rotationally fast way to the axle shaft gears.

Differential drives of said type are known from DE 198 54 215 A1 wherein the inner bearing races of the rolling contact bearings are mounted on the outside of sleeve projections on covers of the differential carrier, and the outer bearing races of the rolling contact bearings are mounted in bores of bearing holding rings which, in consequence, are very large and require large openings in the drive housing for being inserted into same. The bearing holding rings have been widened to form out-of-round covers.

SUMMARY OF THE INVENTION

It is therefore the object of the present invention to propose a differential drive of the above-mentioned type which comprises a stiff and short drive housing. The objective is achieved by providing a differential drive with the following characteristics:

at the differential carrier, there are formed projections which extend co-axially relative to the longitudinal carrier axis and into which there are inserted outer bearing races of the rolling contact bearings;

in the drive housing, there is provided a side opening which can be closed by a side cover and through which the differential carrier with inserted outer bearing races of the rolling contact bearings can be inserted;

in the drive housing, there are provided bores which extend co-axially relative to the longitudinal drive axis and into which there are inserted bearing holding rings which carry inner bearing races of the rolling contact bearings and which, together with said inner bearing races, can be inserted into the bores co-axially relative to the longitudinal drive axis.

In this way, the length of the side opening of the bore and the diameter of its bore for the bearing holding rings are reduced to a minimum. With the assumed differential carrier size as given, the drive housing thus becomes more compact and stiffer.

According to a preferred embodiment, it is proposed that the length L2 of the side opening in the axial direction is greater than the length L1 of the differential carrier with inserted inner bearing races of the rolling contact bearings and smaller than the length L3 of the differential carrier including the fully mounted rolling contact bearings. A further advantageous embodiment provides that the rolling contact members of the rolling contact bearings are held, so as not to get lost, on the inner bearing races by a cage and that the outer bearing races of the rolling contact bearings are axially releasable from the rolling contact members. Furthermore, it is proposed that the bores in the drive housing for the bearing holding rings comprise a diameter B which is greater than the diameter D2 over the outer edges of the rolling contact members resting on the inner bearing races and which is smaller than the diameter D1 of the outer bearing races of the rolling contact bearings. Finally, a preferred embodiment provides that the bearing assembly constitutes an O-assembly, i.e. the effective lines of the rolling contact bearings, on the longitudinal drive axis, form two cones whose points point outwardly.

Furthermore, the solution in accordance with the invention provides a method of assembling a differential drive having a drive housing with a longitudinal drive axis; having a drivable differential carrier which is rotatably supported in the drive housing by means of two rolling contact bearings, which comprises a longitudinal carrier axis and in which there are arranged and rotatably supported two axle shaft gears whose axes extend co-axially relative to the longitudinal carrier axis and in which differential carrier there is arranged a plurality of differential gears whose axes are arranged radially relative to the longitudinal carrier axis, said differential gears being held so as to rotate with said differential carrier, wherein said axle shaft gears engage the differential gears; and having constant velocity joints which are positioned inside the differential carrier and whose outer joint parts are connected in a rotationally fast way to the axle shaft gears. At the differential carrier, there are formed projections which extend co-axially relative to the longitudinal carrier axis and into which there are inserted outer bearing races of the rolling contact bearings. In the drive housing, there is provided a side opening which can be closed by a side cover and through which the differential carrier with inserted outer bearings races of the rolling contact bearings can be inserted. In the drive housing, there are provided bores which extend co-axially relative to the longitudinal drive axis and into which there are inserted bearing holding rings which carry inner bearing races of the rolling contact bearings and which, together therewith, can be inserted into the bores co-axially relative to the longitudinal drive axis. The above method comprises the following stages: the outer bearing races of the rolling contact bearings are inserted into the projections in the differential carrier; the inner bearing races including the rolling contact members mounted thereon are placed on to the bearing holding rings; the differential carrier with the outer bearing races is inserted through the side opening into the drive housing; and the bearing holding rings with the inner bearing races and the rolling contact members are axially inserted through the bores into the drive housing, with the rolling contact bearings thus being completed. Finally, the bearing holding rings are bolted to the drive housing or axially secured in the drive housing by securing rings inserted into grooves in the bores, with the pre-tension in the bearings being set in each case and with the side cover being bolted on to the side opening. The design in accordance with the invention is thus characterised in that, in the course of the assembly operation, the rolling contact bearings are completed only at the end when the bearing holding rings are inserted into the drive housing, with the diameter of the bores for the bearing holding rings being reduced considerably because the differential carrier with the already-inserted outer bearing races of the rolling contact bearings is inserted from one side into the drive housing.

BRIEF DESCRIPTION OF THE DRAWINGS

A preferred embodiment of the invention will be described below with reference to the drawings wherein.

DETAILED DESCRIPTION OF THE INVENTION

Figure 1:
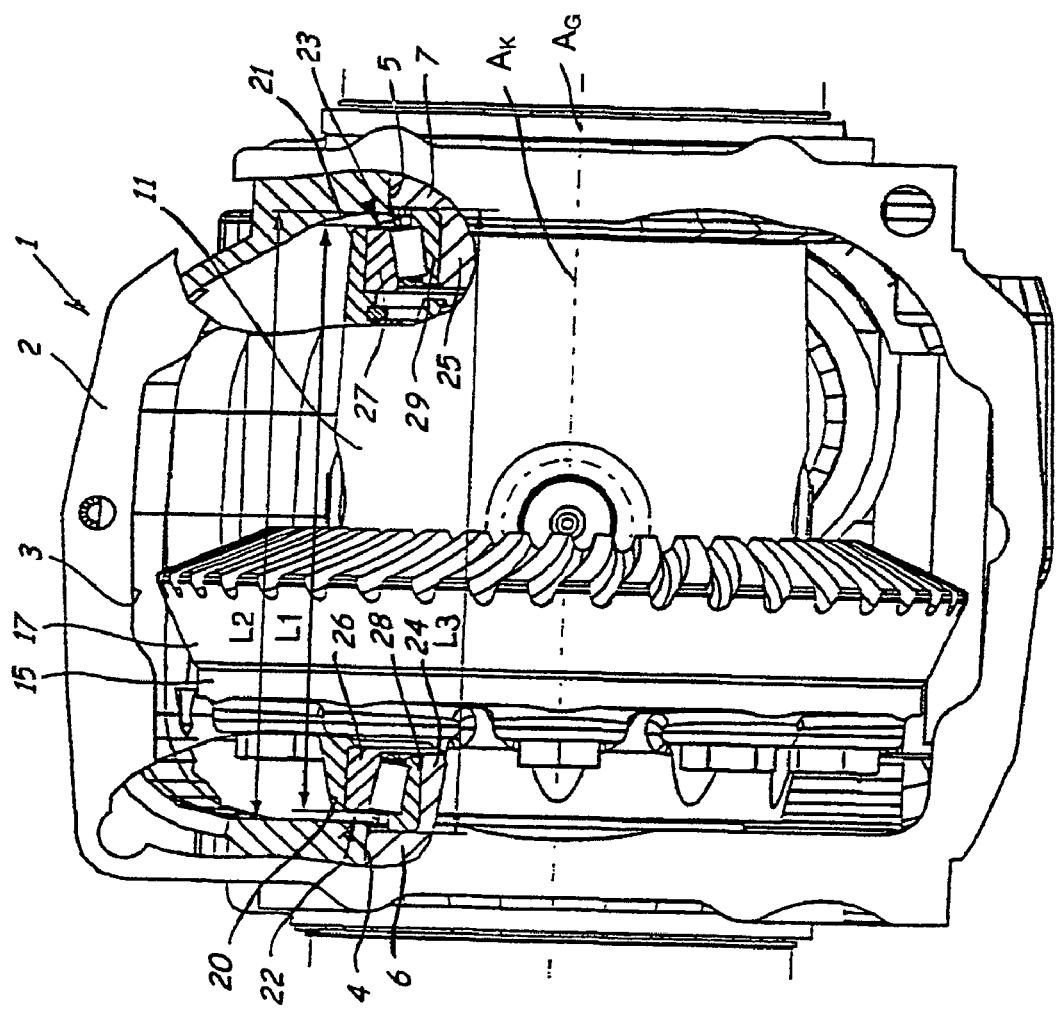
FIG. 1 shows a completely assembled inventive differential drive, with only the side cover missing.

FIG. 1 shows a differential drive with a drive housing 1 which shows a flange face 2 in a plan view. Said flange face 2 surrounds a side opening 3 which can be closed by a side cover (not illustrated) which is bolted against the flange face 2. The longitudinal drive axis AG defines the alignment of two bores 4, 5 in the drive housing, into which bores 4, 5 there are inserted bearing holding rings 6, 7. A differential carrier 11 whose longitudinal carrier axis $A_K$ coincides with the longitudinal drive axis $A_G$ is inserted into the drive housing 1. A crown wheel 17 is bolted to the flange 15 at the differential carrier 11. The carrier 11 comprises projections 20, 21 into which there are inserted outer bearing races 26, 27 of rolling contact bearings 22, 23 whose inner bearing races 28, 29 are slid onto projections 24, 25 of the bearing holding rings 6, 7. The axial length of the differential carrier 11 extending over the projections 20, 21 with the inserted outer bearing races 26, 27 of the rolling contact bearings has been given the reference symbol L1, the axial length of the side opening 3 of the drive housing has been given the reference symbol L2 and the axial length of the bearing assembly extending across the inner bearing races 28, 29 of the rolling contact bearing the reference symbol L3. The length ratios are defined by L1<L2<L3.

Figure 2:
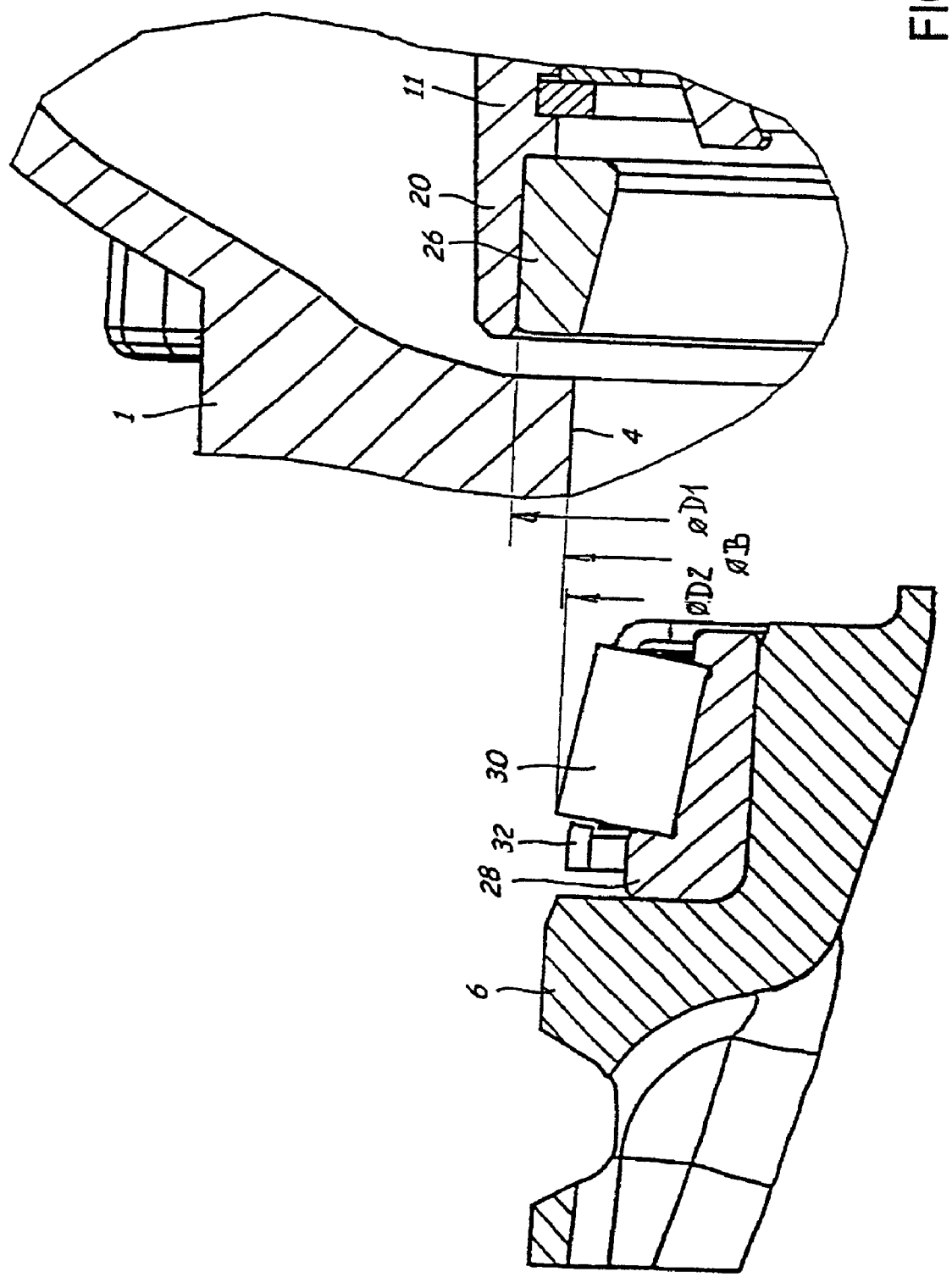
FIG. 2 shows enlarged details of a rolling contact bearing of the differential carrier during assembly.

FIG. 2 shows details regarding the bearing during assembly. Into the drive housing 1, there is inserted the differential carrier 11 which can be seen to be provided with the projection 20 with the inserted inner bearing race 26 of the rolling contact bearing 22 in the predetermined position in the region of the bore 4. The bearing holding ring 6 is still outside the drive housing 1, with the inner bearing race 28 of the rolling contact bearing with the rolling contact members 30 and the cage 32 being slipped on to the projection 24 of said bearing holding ring 6. The outer diameter D1 of the outer bearing race 26 is greater than the diameter B of the bore 4. The diameter B, in turn, is greater than the outer diameter D2 extending over the outer edge of the rolling contact member 30.

Figure 3:
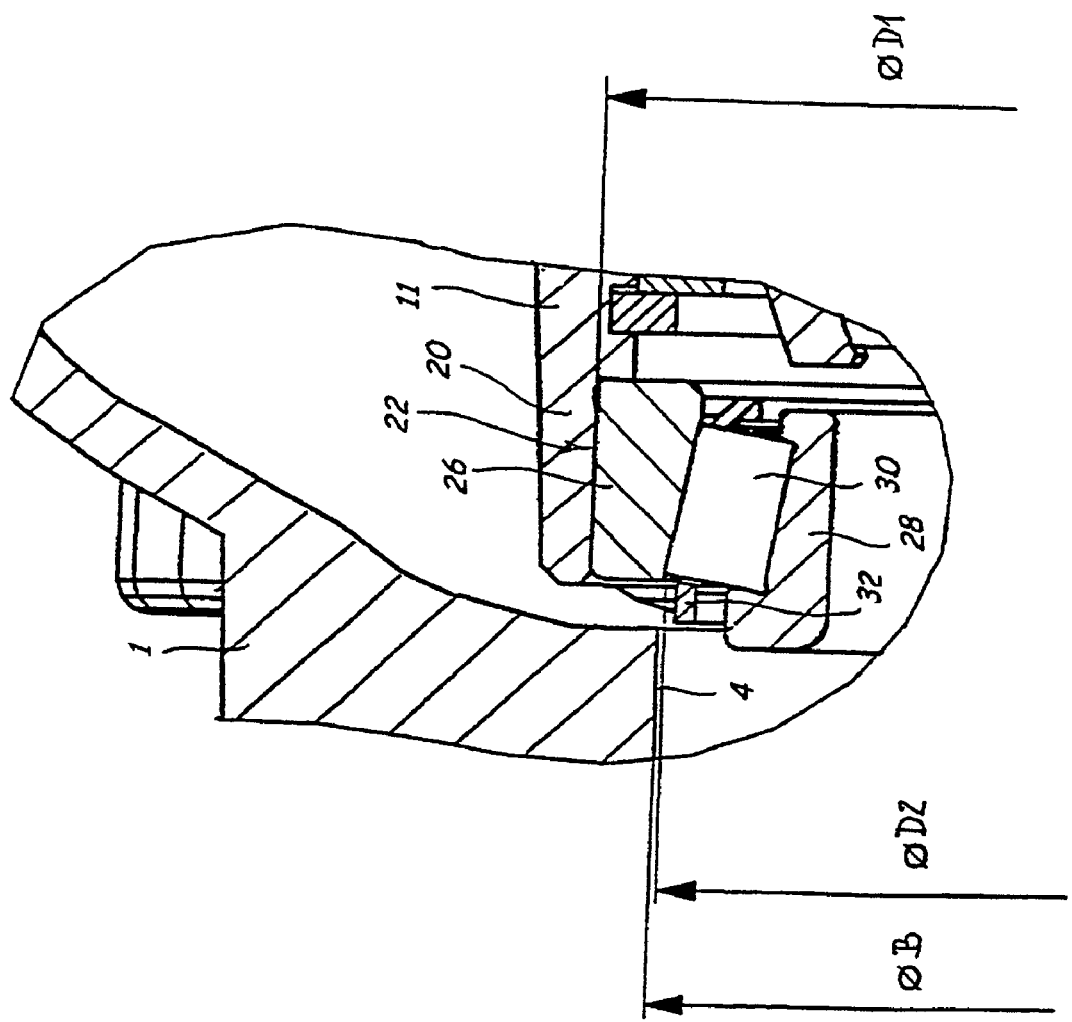
FIG. 3 shows details of a rolling contact bearing of the differential carrier after assembly, but without the bearing holding ring.

In FIG. 3 the same details as in FIG. 2 are shown, with the exception of the bearing holding ring 6 which has not been shown for drawing reasons. The outer bearing race 26, the rolling contact members 30 and the inner bearing race 28 have been assembled to form the complete rolling contact bearing 22.

LIST OF REFERENCE NUMBERS 1 drive housing
2 flange
3 side opening
4 bore
5 bore
6 bearing holding ring
7 bearing holding ring
11 differential carrier
12 —
15 flange
16 —
17 crown wheel
20 projection
21 projection
22 rolling contact bearing
23 rolling contact bearing
24 projection
25 projection
26 outer bearing race
27 outer bearing race
28 inner bearing race
29 inner bearing race
30 rolling contact member
31 rolling contact member
32 cage

What is claimed is:

1. A differential drive comprising:
   a drive housing with a longitudinal drive axis ($A_G$);
   a drivable differential carrier which is rotatably supported in the drive housing by two rolling contact bearings, and which comprises a longitudinal carrier axis ($A_K$) and in which there are arranged and rotatably supported two axle shaft gears whose axes extend co-axially relative to the longitudinal carrier axis and in said differential carrier there is arranged a plurality of differential gears whose axes are arranged radially relative to the longitudinal carrier axis, said differential gears being held so as to rotate with said differential carrier, wherein said axle shaft gears engage the differential gears;
   constant velocity joints which are positioned inside the differential carrier and whose outer joint parts are connected in a rotationally fast way to the axle shaft gears; and
   projections formed at the differential carrier which extend co-axially relative to the longitudinal carrier axis and into which there are inserted outer bearing races of the rolling contact bearings;
   wherein, in the drive housing, there is provided a side opening which can be closed by a side cover and through which the differential carrier with the inserted outer bearing races of the rolling contact bearings can be inserted; and
   wherein in the drive housing, there are provided bores which extend co-axially relative to the longitudinal drive axis and into which there are inserted bearing holding rings which carry inner bearing races of the rolling contact bearings and which, together with said inner bearing races, can be inserted into the bores co-axially relative to the longitudinal drive axis ($A_G$), and
   wherein a length (L2) of the side opening in the axial direction is greater than a length (L1) of the differential carrier with the inserted inner bearing races of the rolling contact bearings and smaller than length (L3) of the differential carrier including the fully mounted rolling contact bearings.

2. A drive according to claim 1 wherein rolling contact members of the rolling contact bearings are held on the inner bearing races by a cage and wherein the outer bearing races of the rolling contact bearings are axially releasable from the rolling contact members.

3. A drive according to claim 1 wherein the bores in the drive housing for the bearing holding rings comprise a diameter (B) which is greater than a diameter (D2) over the outer edges of rolling contact members resting on the inner bearing races and which is smaller than a diameter (D1) of the outer bearing races of the rolling contact bearings.

4. A drive according to claim 2 wherein the bores in the drive housing for the bearing holding rings comprise a diameter (B) which is greater than a diameter (D2) over the outer edges of the rolling contact members resting on the inner bearing races and which is smaller than a diameter (D1) of the outer bearing races of the rolling contact bearings.

5. A drive according to claim 1 wherein effective lines of the rolling contact bearings form two cones on the longitudinal drive axis ($A_G$), whose points point outwardly.

6. A differential drive comprising:
   a drive housing with a longitudinal drive axis ($A_G$);
   a drivable differential carrier which is rotatably supported in the drive housing by two rolling contact bearings, and which comprises a longitudinal carrier axis ($A_K$) and in which there are arranged and rotatably supported two axle shaft gears whose axes extend co-axially relative to the longitudinal carrier axis and in said differential carrier there is arranged a plurality of differential gears whose axes are arranged radially relative to the longitudinal carrier axis, said differential gears being held so as to rotate with said differential carrier, wherein said axle shaft gears engage the differential gears; and
   constant velocity joints which are positioned inside the differential carrier and whose outer joint parts are connected in a rotationally fast way to the axle shaft gears; and
   projections formed at the differential carrier which extend co-axially relative to the longitudinal carrier axis and into which there are inserted outer bearing races of the rolling contact bearings;
   wherein, in the drive housing, there is provided a side opening which can be closed by a side cover and through which the differential carrier with the inserted outer bearing races of the rolling contact bearings can be inserted; and
   wherein in the drive housing, there are provided bores which extend co-axially relative to the longitudinal drive axis and into which there are inserted bearing holding rings which carry inner bearing races of the rolling contact bearings and which, together with said inner bearing races, can be inserted into the bores co-axially relative to the longitudinal drive axis ($A_G$), and
   wherein the bores in the drive housing for the bearing holding rings comprise a diameter (B) which is greater than a diameter (D2) over the outer edges of rolling contact members resting on the inner bearing races and which is smaller than a diameter (D1) of the outer bearing races of the rolling contact bearings.

7. A drive according to claim 6 wherein the effective lines of the rolling contact bearings form two cones on the longitudinal drive axis ($A_G$), whose points point outwardly.

8. A method of assembling a differential drive according to claim 1 comprising the steps of:
   inserting the outer bearing races of the rolling contact bearings into the projections in the differential carrier;
   placing the inner bearing races including rolling contact members mounted thereon on to the bearing holding rings;
   inserting the differential carrier with the outer bearing races through the side opening into the drive housing; and
   axially inserting the bearing holding rings with the inner bearing races and the rolling contact members through the bores in the drive housing, with the rolling contact bearings thus being completed.

9. A method according to claim 8 comprising, while setting a pre-tension for the bearings, bolting the bearing holding rings to the drive housing, and bolting the side cover on to the side opening.

10. A method according to claim 8 comprising, while setting a pre-tension for the bearings, axially fixing the bearing holding rings in the drive housing by securing rings inserted into grooves in the bores, and bolting the side cover on to the side opening.

* * * * *